Patented May 7, 1929.

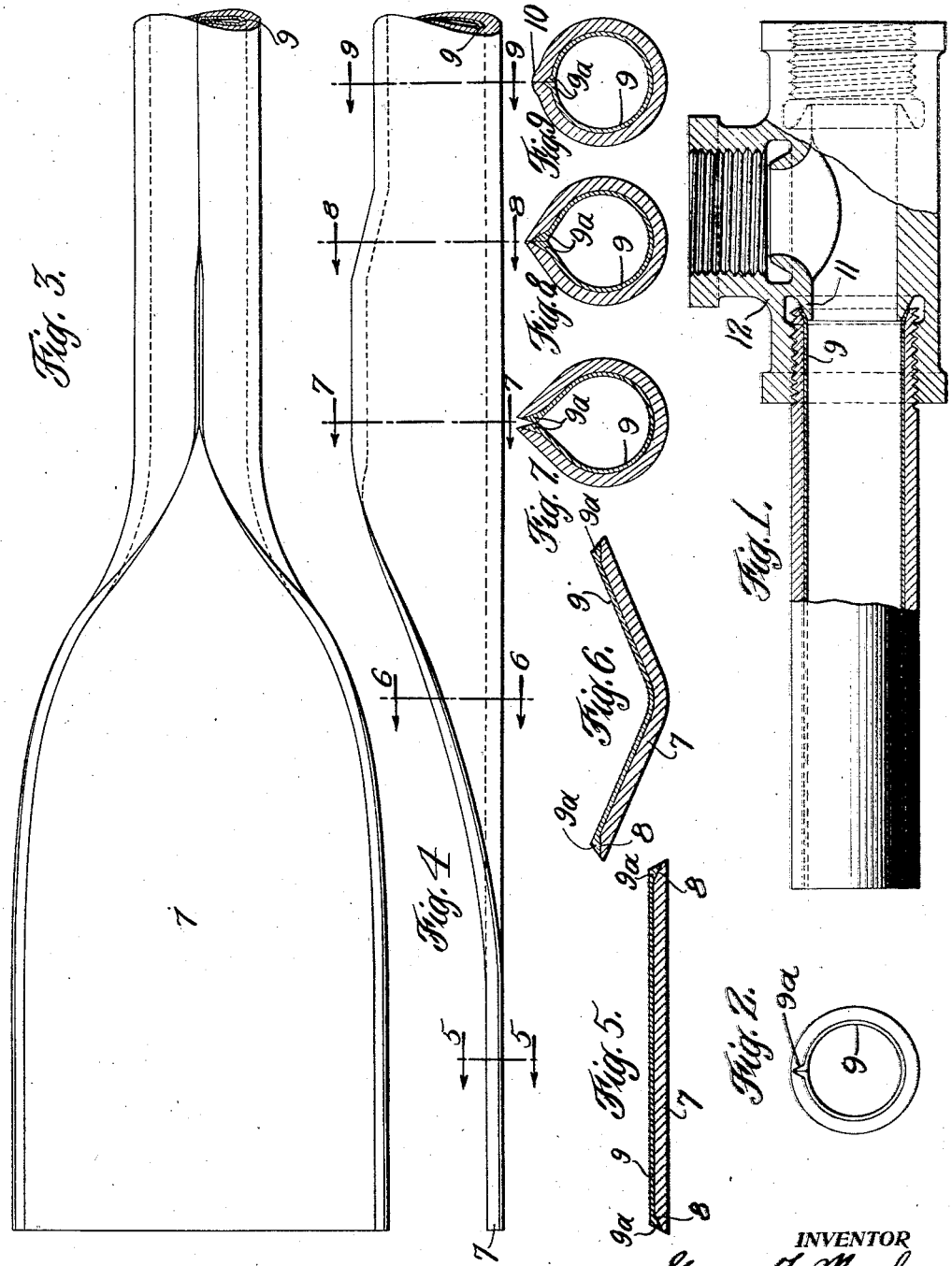

1,712,090

UNITED STATES PATENT OFFICE.

GEORGE F. MURPHY, OF PHILADELPHIA, PENNSYLVANIA.

METHOD OF MAKING LINED PIPING.

Application filed March 22, 1924. Serial No. 701,039.

This invention relates to lined piping and method of making the same, and it is useful in connection with all kinds of metal pipes, which, for practical reasons, it is desirable to line with copper or other suitable metal which will not rust or corrode, or which has other properties rendering it suitable to the needs of the particular use to which the pipe is to be put.

I am aware that many attempts have been made to line pipe or tubing already formed, as by electroplating, tinning, galvanizing and the like; but these processes are either ineffective for the purpose intended or are too expensive as compared to the cost of brass or copper pipe.

It is the principal object of my invention to produce lined metallic pipe economically, so that the field of its use may be widely extended. Another object is to produce a lined pipe the lining of which covers and protects the inside of the pipe. This is accomplished as follows:—

In carrying out my invention, I propose to first line a skelp with a suitable lining metal and then bend or shape the skelp into tubular form. The bending or shaping may be accomplished by any of the standard means and methods followed in making longitudinal joint pipe from skelp. The lining, however, is applied to the skelp in such manner as to secure a bond or union between the metals such as will withstand the various forming operations. As one method of accomplishing this, the lining may be electro-welded to the skelp. The joint (which may be of the butt, lap, combination butt-lap, or other type) is closed in any desired manner as, for example, by welding or brazing or the like.

One of the more specific objects of the invention is to ensure the protection of the metal of the skelp at the joint by the lining material.

By way of illustration, I have shown and will describe the invention as I would prefer to practice it in the production of butt-joint lined tubing, it being understood that the invention is not limited thereto.

Of the drawings:

Fig. 1 is a partial elevation and section through piping made in accordance with my invention and a connection for coupling lengths of such piping, which also forms a part of the invention;

Fig. 2 is an end elevation of the pipe shown in Fig. 1;

Fig. 3 is a fragmentary plan view illustrating how the pipe is formed into a tube from the skelp;

Fig. 4 is a side elevation of Fig. 3; and Figs. 5 to 9 inclusive are sections respectively taken on the lines 5—5, 6—6, 7—7, 8—8, 9—9 of Fig. 4.

In the preferred practice of my invention, as applied to butt-joint pipe, I provide a skelp 7 having its longitudinal edge portions chamfered, or otherwise reduced in thickness, as indicated by the reference character 8. This skelp I line or coat with a suitable metal such as copper, the lining or coating 9 being applied in such way that there is a firm bond or union between the lining and the skelp preferably over the entire surface as above described. In this way a lining of uniform thickness may be readily applied without the imperfections which are incident to the linings applied to already formed pipe made in accordance with some of the practices mentioned.

The lining 9 is carried over the chamfered surfaces 8, preferably so as to leave an excess amount of material $9^a$ at the butt or longitudinal edges of the skelp. On inspection of Figs. 3 and 5 it will be seen that the longitudinal edges, considered as a whole and as composed of the skelp and the portions $9^a$ of the lining, preferably incline upwardly and inwardly, i. e. they are chamfered.

The skelp is first bent into the form illustrated in Fig. 6, after which it assumes the form indicated in Fig. 7, on inspection of which it will be seen that the corners of the portions $9^a$ of the lining abut one another, forming the base of a V-shape groove. Further action of the rolls closes the V, by crowding the narrow edge portions of the skelp inward and into substantial abutment. By virtue of this, the portions $9^a$ are forced against one another and may, in fact, be compressed. This insures the filling of the space between the chamfered edge portions 8 of the skelp by the lining and forces the abutting surfaces of the lining into tight contact with one another. At this point it is desirable to close the joint, and I prefer to do this by gas or electric welding, brazing, fusing or soldering or the like. On further progress through the rolls, the tube assumes the shape indicated in Fig. 9. The burr 10 which is left is removed by any preferred means, in a manner well understood in this art.

The chamfering of the edges of the skelp also secures an excess of lining metal at the point which ensures the covering of the inner surface, even if some of the lining metal be lost in the process of welding.

Referring to Fig. 1 it will be seen that I have peened or otherwise enlarged the internal diameter of the pipe at the end so as to cooperate with the lip 11 of the coupling or connection 12, which is preferably made of a non-oxidizing, non-corroding metal. The lip 11 cooperates with the lining 9 to protect the metal of the skelp at the end of the pipe as against the action of any fluid that may be conducted through the piping. In many cases, as in pipe of small diameter the initial peening or enlarging may be dispensed with, the screwing in of the pipe against the lip serving to secure the desired results. The connection or coupling is simple to manufacture.

I claim:

1. The process of making lined pipe which consists in lining the skelp with an excess of the lining metal at the edges forming the butt joint, in forming the skelp into tubular shape and in closing the joint.

2. The process of making lined pipe which consists in lining the skelp with an excess of the lining metal at the edges forming the butt joint, in forming the skelp into tubular shape and in welding the joint.

3. The process of making lined pipe which consists in lining the skelp with an excess of the lining metal at the edges forming the butt joint, in forming the skelp into tubular shape and in bonding the joint.

4. The process of making lined pipe which consists in forming a skelp with the butt joint edges chamfered in lining the skelp inclusive of the chamfered face with a lining metal, in forming the skelp into tubular shape, and in closing the joint.

5. The process of making lined pipe which consists in forming a skelp with the butt joint edges chamfered in lining the skelp inclusive of the chamfered face with a lining metal, in forming the skelp into tubular shape, and in welding the joint.

6. The process of making lined pipe which consists in forming a skelp with the butt joint edges chamfered in lining the skelp inclusive of the chamfered face with a lining metal, in forming the skelp into tubular shape, and in closing the joint by uniting the respective metals at the joint.

7. The process of making lined pipe which consists in providing a skelp with its butt edges reduced in thickness, in lining the skelp with a metal of greater conductivity, and providing thickened portions on the lining overlying the reduced portions of the skelp in forming the skelp into tubular form, and in electrically welding the butt joint.

8. The process of making lined pipe which consists in providing a skelp with its butt edges reduced in thickness, in lining the skelp with a metal of greater conductivity, in forming the skelp into tubular form, and in electrically welding the butt joint, the mass of lining metal at the joint being greater than elsewhere so that it will not run out during the welding.

9. The process of making butt joint lined pipe which consists in lining a skelp, in forming the skelp into tubular form, and in electrically uniting the joint, with the mass of lining metal at the joint greater than elsewhere so that it will not run out during such uniting.

In testimony whereof, I have hereunto signed my name.

GEORGE F. MURPHY.